(12) United States Patent
Aoto et al.

(10) Patent No.: US 6,454,416 B2
(45) Date of Patent: Sep. 24, 2002

(54) COLOR LIQUID CRYSTAL PROJECTOR HAVING AN IMPROVED OPTICAL SYSTEM

(75) Inventors: Katsuhide Aoto, Mobara; Kaoru Yanagawa, Chosei, both of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/841,605

(22) Filed: Apr. 25, 2001

(30) Foreign Application Priority Data

May 11, 2000 (JP) ........................................ 2000-138630

(51) Int. Cl.[7] ...................... G03B 21/00; G03B 21/26; G02F 1/335; H04N 9/12
(52) U.S. Cl. ............................. 353/31; 353/33; 353/34; 353/37; 349/5; 349/9; 348/742
(58) Field of Search ............................. 353/31, 33, 34, 353/37; 348/742; 349/5, 9

(56) References Cited

U.S. PATENT DOCUMENTS 6,176,586 B1 * 1/2001 Hirose et al. .................. 353/31
6,273,567 B1 * 8/2001 Conner et al. ................. 353/20
6,309,071 B1 * 10/2001 Huang et al. .................. 353/31

* cited by examiner

*Primary Examiner*—Russell Adams
*Assistant Examiner*—Melissa Koval
(74) *Attorney, Agent, or Firm*—Antonelli, Terry, Stout & Kraus, LLP

(57) ABSTRACT

A color liquid crystal projector has an optical system for color splitting. The optical system includes a mirror for reflecting a first primary-color light and transmitting second and third primary-color lights in light from a light source; a first phase plate for transmitting the second primary-color light from the mirror with its polarization degree rotated through 90°, and for transmitting the third primary-color light; a first prism for transmitting the second primary-color light from the first phase plate into a second liquid crystal display panel, and reflecting the third primary-color light from the first phase plate into a third liquid crystal display panel; a second prism for entering the first primary-color light from the mirror into a first liquid crystal display panel; and a dichroic prism for combining the first, second and third primary-color lights reflected from the liquid crystal display panels.

8 Claims, 7 Drawing Sheets

FIG. 8

COLOR LIQUID CRYSTAL PROJECTOR HAVING AN IMPROVED OPTICAL SYSTEM

BACKGROUND OF THE INVENTION

The present invention relates to a liquid crystal projector, and in particular to a color liquid crystal projector having an improved optical system.

The color liquid crystal projector is such that white light from one light source is split into three primary colors of red (R), green (G) and blue (B), then the three lights of the primary colors are entered into the red-color, green-color and blue-color liquid crystal display panels, respectively, and then the three lights of the primary colors reflected from the respective liquid crystal display panels are recombined and are projected onto a screen via a projection lens.

Conventionally, a means for splitting white light from one light source into three primary-color lights and for splitting and combining the polarized light comprises three polarizing beam splitters for the three primary colors, respectively, and a means for combining the three primary-color lights uses a cross dichroic prism.

SUMMARY OF THE INVENTION

In the liquid crystal projector of the above configuration, the optical system for color splitting and color recombination is large in size, and further, a problem has been pointed out that, because two liquid crystal display panels face toward each other with two of the three polarizing beam splitters and the cross dichroic prism interposed therebetween, the contrast ratio of the combined images is reduced by light reflections between the two opposing liquid crystal display panels.

The present invention has been made in view of the above situations, and therefore it is an object of the present invention to provide a small and lightweight liquid crystal projector. Further, it is another object of the present invention to provide a liquid crystal projector featuring a good contrast ratio.

The following explains briefly an outline of representative ones of the inventions disclosed in this specification.

In accordance with an embodiment of the present invention, there is provided a color liquid crystal projector including an optical system for splitting light from a light source into first primary-color light, second primary-color light and third primary-color light, first, second and third reflection type liquid crystal display panels corresponding to the first primary-color light, the second primary-color light and the third primary-color light, respectively, and a projection lens for projecting the first primary-color light, the second primary-color light and the third primary-color light from the optical system onto a screen, the optical system comprising: a linear polarizer receiving the light from the light source; a mirror for reflecting the first primary-color light in the light from the linear polarizer and transmitting the second primary-color light and the third primary-color light in the light from the linear polarizer; a first phase plate for rotating a direction of polarization of the second primary-color light from the mirror through 90° and transmitting the second primary-color light, and for transmitting the third primary-color light without changing a direction of polarization thereof; a first prism for transmitting the second primary-color light from the first phase plate and then entering the second primary-color light into the second liquid crystal display panel, and reflecting the third primary-color light from the first phase plate and then entering the third primary-color light into the third liquid crystal display panel; a second prism for entering the first primary-color light from the mirror into the first liquid crystal display panel; and a dichroic prism for combining the first primary-color light, the second primary-color light and the third primary-color light reflected from the first, second and third liquid crystal display panels, respectively.

In accordance with another embodiment of the present invention, there is provided a color liquid crystal projector comprising a light source and an optical system for reflecting light from the light source by reflection type liquid crystal display panels and projecting light reflected from the reflection type liquid crystal display panels, the optical system including: a mirror for reflecting a light of a first wavelength of the light from the light source and reflecting lights of second and third wavelengths of the light from the light source; a first phase plate for rotating a direction of polarization of the light of the second wavelength through 90° from the mirror and transmitting the light of the second wavelength, and transmitting the light of the third wavelength without changing a direction of polarization thereof; a first prism for transmitting the light of the second wavelength from the first phase plate and reflecting the light of the third wavelength from the first phase plate; a first reflection type liquid crystal display panel for reflecting the light of the first wavelength from the mirror; a second reflection type liquid crystal display panel for reflecting the light of the second wavelength from the first prism; a third reflection type liquid crystal display panel for reflecting the light of the third wavelength from the first prism; and a dichroic prism for combining lights from the first, second and third reflection type liquid crystal display panels, each of the first, second and third reflection type liquid crystal display panels being provided with reflective electrodes for reflecting light entering a liquid crystal layer thereof.

The liquid crystal projectors of the above configuration are capable of being made smaller in size than the conventional liquid crystal projector requiring a prism for each of the liquid crystal display panels, because the two liquid crystal display panels can be disposed with the above-described prism interposed therebetween.

The mirror is used instead of the prisms, as an element for reflecting a first primary-color light in white light from the light source and transmitting a second primary-color light and a third primary-color light, and consequently, the liquid crystal projector is capable of being made lightweight.

Two of the three required liquid crystal display panels are capable of being disposed at the two sides of the prism perpendicular to each other, respectively, and consequently, they do not need to be disposed to face each other with the prism interposed therebetween. As a result, light incident on one of the three liquid crystal display panels does not enter another of the three liquid crystal display panels, and therefore the display contrast ratio is improved.

BRIEF DESCRIPTION OF THE DRAWINGS

In the accompanying drawings, in which like reference numerals designate similar components throughout the figures, and in which.

DETAILED DESCRIPTION OF THE PREFERRED EMBODIMENTS

An embodiment of the liquid crystal projector in accordance with the present invention will be explained with reference to the drawings.

Figure 1:
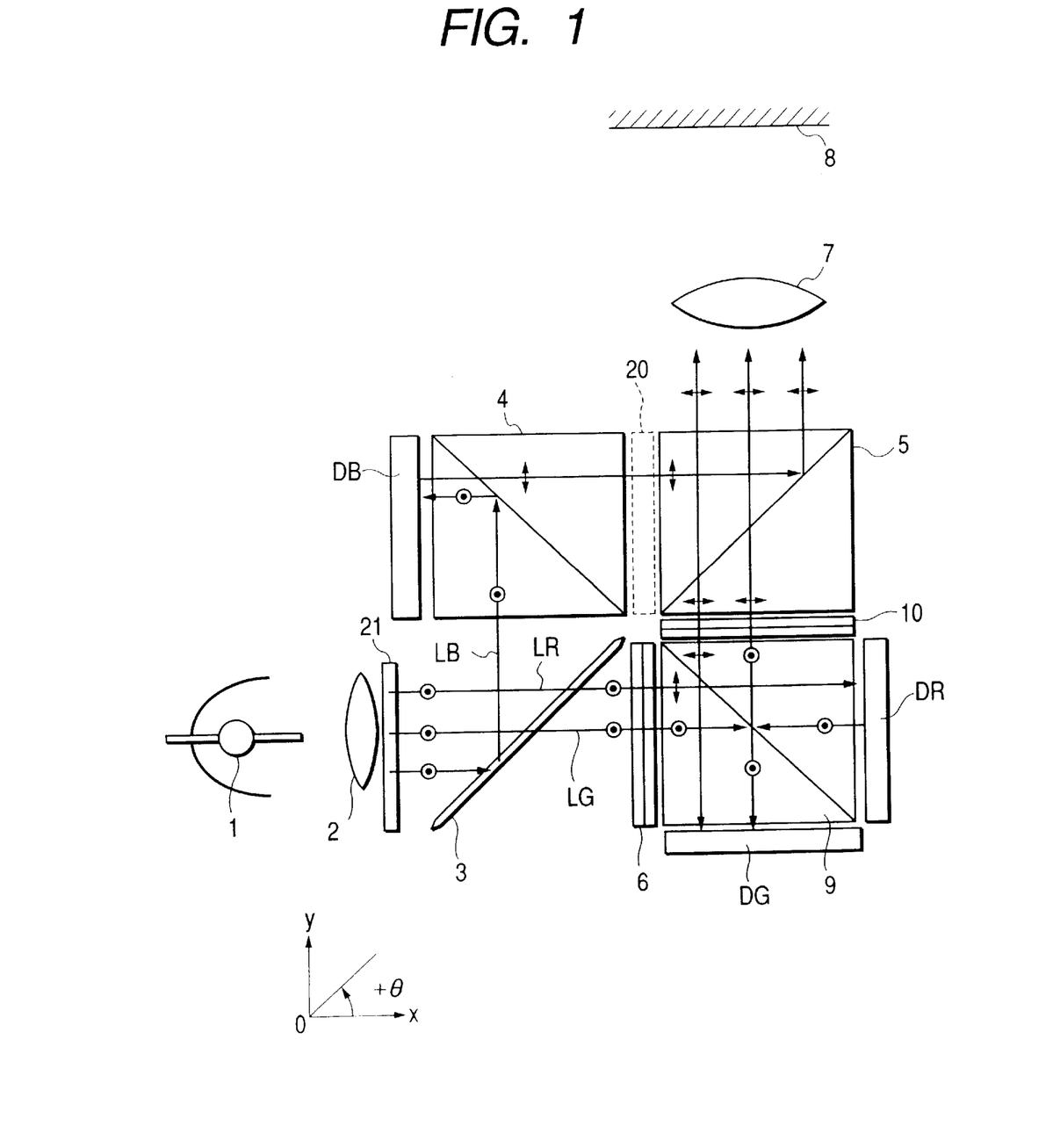
FIG. 1 is an illustration of an embodiment of the liquid crystal projector in accordance with the present invention.

FIG. 1 illustrates a configuration of an embodiment of the liquid crystal projector in accordance with the present invention including optical paths therein.

A dichroic mirror 3 is disposed to the right of a light source 1 with an illuminating optical system 2 and a polarizer 21 interposed therebetween, and the mirror plane of the dichroic mirror 3 is oriented at 45° to the x axis in a system of rectangular co-ordinates in FIG. 1.

A first polarizing beam splitter 4 is disposed adjacently to and above the dichroic mirror 3 with its reflective plane oriented at −45° to the x axis. A blue-color liquid crystal display panel DB for a blue color display is disposed adjacently to and to the left of the first polarizing beam splitter 4.

A second polarizing beam splitter 9 is disposed adjacently to and to the right of the dichroic mirror 3 with its reflective plane oriented at −45° to the x axis. Disposed adjacently to the second polarizing beam splitter 9 are a first phase plate 6 on the dichroic-mirror 3 side thereof, a green-color liquid crystal display panel DG for a green color display below the second polarizing beam splitter 9, and a red-color liquid crystal display panel DR for a red color display to the right of the second polarizing beam splitter 9.

A dichroic prism 5 is disposed above the second polarizing beam splitter 9 (to the right of the first polarizing beam splitter 4) with its reflective plane oriented at 45° to the x axis. A second phase plate 10 is disposed between the second polarizing beam splitter 9 and the dichroic prism 5. A projection lens 7 is disposed above the dichroic prism 5.

In the liquid crystal projector having the above optical system, light from the light source 1 enters the illuminating optical system 2 and the polarizer 21, is collimated, and produces so-called s-polarized light having a homogenized distribution. The light from the illuminating optical system 2 enters the dichroic mirror 3, then a blue light LB of the light is reflected at 90° from the x axis, and the yellow light of the light is transmitted. Here, although, instead of the dichroic mirror 3, a dichroic prism similar to the dichroic prism 5 explained subsequently can be used, this embodiment uses the dichroic mirror 3 for weight reduction of the liquid crystal projector.

After having changed its optical path, the blue light LB enters the first polarizing beam splitter 4, then changes its optical path through an angle of 90° and enters the blue-color liquid crystal display panel DB disposed adjacently to the first polarizing beam splitter 4.

The blue-color liquid crystal display panel DB comprises an envelope formed of two opposing transparent substrates with a spacing therebetween, liquid crystal sandwiched between the two substrates and a large number of pixel electrode formed in a matrix fashion between inner surfaces of the two substrates, and light transmission through the liquid crystal in each of the pixels is controlled by external video signals.

The liquid crystal display panel DB in this embodiment is of the reflection type. Light from the first polarizing beam splitter 4 passes through the liquid crystal the light transmission through which is controlled in the respective pixels, then is reflected by a reflective plate (or a reflective film) provided to the liquid crystal display panel DB, then the reflected light is modulated by the liquid-crystal and enters the first polarizing beam splitter 4 again.

The liquid crystal projector of this embodiment includes the red-color liquid crystal display panel DR and the green-color liquid crystal display panel DG as subsequently described, in addition to the blue-color liquid crystal display panel DB, and the red-color and green-color liquid crystal display panels DR, DG are similar in configuration to the blue-color liquid crystal display panel DB. The three liquid crystal display panels DB, DG, DR are driven by video signals of corresponding colors, respectively, supplied simultaneously.

The reflected light from the blue-color liquid crystal display panel DB enters the dichroic prism 5 after passing through the first polarizing beam splitter 4. The dichroic prism 5 changes the optical path of the blue light LB into a direction at an angle of 90° with respect to the x axis, and passes red light LR and green light LG therethrough.

The blue light LB entered into the dichroic prism 5 is directed toward the projection lens 7 by the dichroic prism 5, and then is projected onto a screen 8 positioned separately from the liquid crystal projector by the projection lens 7.

The yellow light having passed through the dichroic mirror 3 passes through the first phase plate 6, and is split into the green light LG and the red light LR by the first phase plate 6. The first phase plate 6 rotates the direction of polarization of wavelengths in the region of red only through 90°.

The red light LR enters the second polarizing beam splitter 9, passes through it, then enters the red-color liquid crystal display panel DR disposed adjacently to it, then is reflected by the red-color liquid crystal display panel DR, and then enters the second polarizing beam splitter 9 again.

The path of the red light LR modulated by the liquid crystal of the red-color liquid crystal display panel DR is changed by an angle of 90° with respect to the x axis by the second polarizing beam splitter 9, and then the direction of the polarization of the red light is rotated through 90° by the second phase plate 10, and then the red light LR passes through the dichroic prism 5.

The red light LR passing through the dichroic prism 5 is combined with the already explained blue light LB, and then projected onto the screen 8 via the projection lens 7.

The green light LG passes unchanged through the first phase plate 6, then its path is changed by an angle of −90° with respect to the x axis by the second polarizing beam splitter 9, then the green light LG enters the green color liquid crystal display panel DG disposed adjacently to the second polarizing beam splitter 9, then is reflected by the liquid crystal display panel DG, and then enters the second polarizing beam splitter 9. The green light LG reflected by the green color liquid crystal display panel DG has been modulated by the green color liquid crystal display panel DG, then passes through the second polarizing beam splitter 9, then passes through the second phase plate 10, and passes through the dichroic prism 5.

The green light LG passing through the dichroic prism 5 is combined with the already described blue and red lights LB, LR, and is projected onto the screen 8 via the projection lens 7.

In the above configuration, in combining the three color lights, it is conceivable to use a mirror similar to the dichroic mirror 3 instead of the dichroic prism 5. However, it was confirmed that it is not desirable to use such a mirror as the output stage of the optical system because coma is liable to occur.

As is apparent from the above explanation, in the above-described liquid crystal projector, two liquid crystal display panels DG, DR can be disposed with the second polarizing beam splitter 9 therebetween, and consequently, the liquid crystal projector of the above configuration is capable of being made smaller in size than the conventional liquid crystal projector requiring a polarizing beam splitter for each of the liquid crystal display panels.

The dichroic mirror 3 is used instead of a dichroic prism, for reflecting the blue light LB, for example, in light from the light source 1 and transmitting the green light LG and the red light LR, and consequently, the liquid crystal projector is capable of being made lightweight. In this case, there is possibility that the dichroic mirror causes aberration, unlike the prism, but the aberration at the input stage of the optical system causes no particular problems.

Two liquid crystal display panels DG and DR are capable of being disposed at the two mutually perpendicular sides of the polarizing beam splitter 9, respectively, and consequently, they do not need to be disposed to face each other with the polarizing beam splitter 9 interposed therebetween. As a result, light incident on one of the two liquid crystal display panels does not enter the other of the two liquid crystal display panels, and therefore the display contrast ratio is improved.

If a phase plate 20 is disposed between the first polarizing beam splitter 4 and the dichroic prism 5 for rotating the polarization direction of the light passing therethrough through 90° as indicated by a broken line in FIG. 1, the polarized light is converted into the s-polarized light, and as a result, the blue light LB is efficiently reflected by the dichroic prism 5 and the light utilization efficiency is improved.

Insertion of the phase plate 20 or a glass plate between the first polarizing beam splitter 4 and the dichroic prism 5 can equalize the optical path lengths of the lights emergent from the liquid crystal display panels DR, DG and DB.

Unwanted reflections in the optical paths can be reduced by cementing together the first polarizing beam splitter 4, the phase plate 20 or the glass plate, the dichroic prism 5, the second phase plate 10, the second polarizing beam splitter 9 and the first phase plate 6, and consequently, the display contrast ratio can be improved.

The above-described liquid crystal projector uses the reflection type liquid crystal display panel, but the present invention is not limited to the reflection type liquid crystal display panel, and the present invention can utilize the transmission type liquid crystal display panel. When the transmission type liquid crystal display panel is used in the present invention, the above-described basic configuration is the same except for some modifications in the optical system.

As is apparent from the above explanation, the liquid crystal projector in accordance with the present invention realizes reduction of its size and its weight.

The following explains the liquid crystal display panel used in the liquid crystal projector in accordance with the present invention.

Figure 2A:
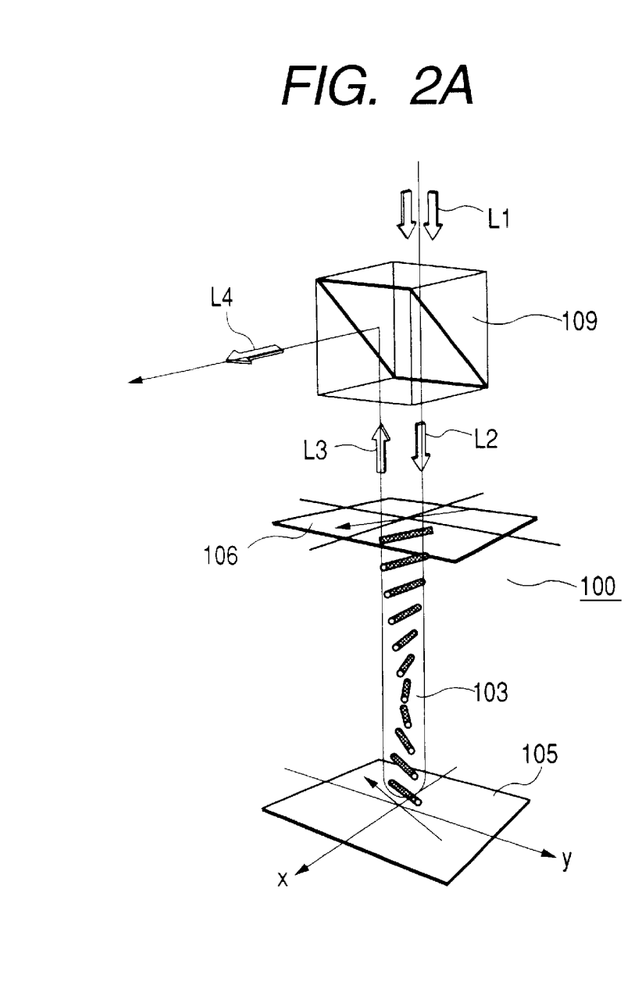
FIGS. 2A and 2B are schematic illustrations for operation of a reflection type liquid crystal display panel of a single-polarizer twisted-nematic mode (SPTN) which is one of electrically controlled birefringent modes, in the field-off and field-on states, respectively.
Figure 2B:
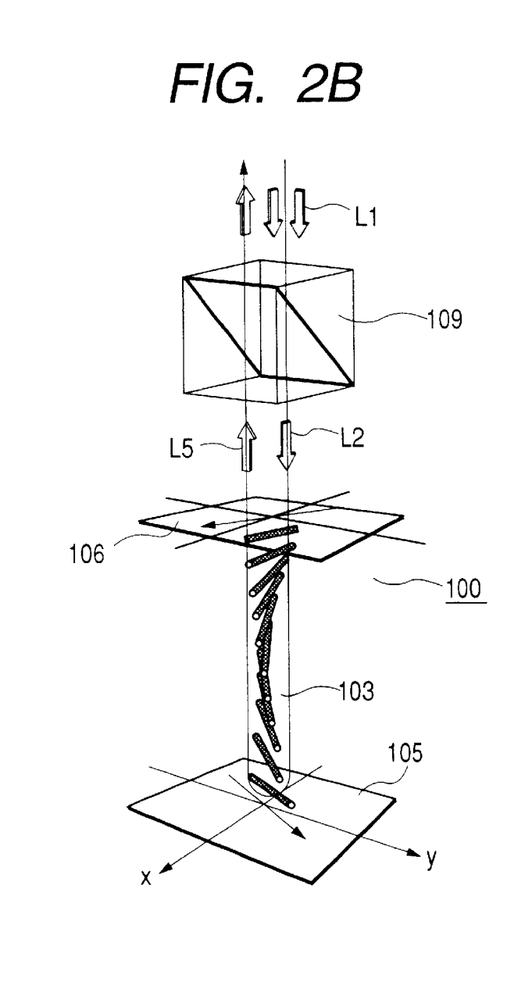

FIGS. 2A and 2B are schematic illustrations for operation of a reflection type liquid crystal display panel of a single-polarizer twisted-nematic mode (SPTN) which is one of electrically controlled birefringent modes. For the sake of clarity, FIG. 2 illustrates the configuration of the liquid crystal display panel 100 schematically. Details of the liquid crystal display panel 100 will be described subsequently. Structures related to splitting and combining of colors are omitted in FIGS. 2A and 2B.

In FIGS. 2A and 2B, reference numeral 105 denotes a reflective electrode formed on one substrate (not shown), 106 is a counter electrode formed on the other substrate (not shown), and 103 is a liquid crystal composition. Reference numeral 109 denotes a polarizing beam splitter which divides an incident light L1 from a light source (not shown) into two polarized lights, and emits a linearly polarized one L2 of the two.

In FIGS. 2A and 2B, a light having passed through the polarizing beam splitter 109, which is a p-polarized light, is entered into the liquid crystal display panel 100, but a light reflected by the polarizing beam splitter 109, which is an s-polarized light, can be entered into the liquid crystal display panel 100 instead.

The liquid crystal composition 103 is a nematic liquid crystal material having positive dielectric anisotropy. Longitudinal axes of the liquid crystal molecules are oriented in parallel with the major surfaces of the reflective electrode 105 and the counter electrode 106, and the liquid crystal molecules are twisted across the liquid crystal layer by about 90° by the orientation films formed on the reflective electrode 105 and the counter electrode 106 when a voltage is not applied between the reflective electrode 105 and the counter electrode 106.

FIG. 2A illustrates a case where no voltage is applied between the reflective electrode 105 and the counter electrode 106. The light L2 entering the liquid crystal display panel 100 is converted into elliptically polarized light by birefringence of the liquid crystal composition 103, and then becomes circularly polarized light on the reflective electrode 105. The light reflected by the reflective electrode 105 passes through the liquid crystal composition 103 again, thereby becomes elliptically polarized light again, and then returns to linearly polarized light again when it leaves the liquid crystal display panel 100. The emergent linearly polarized light L3 is s-polarized light having its direction of polarization rotated through an angle of 90° with respect to that of the incident light L2, enters the polarizing beam splitter 109 again, and then is reflected by an internal interface of the polarizing beam splitter 109 to become emergent light L4 which is projected onto a screen or the like to provide a display. This configuration is of the so-called normally white (normally open) type which emits light when a voltage is not applied across the liquid crystal layer.

FIG. 2B illustrates a case where a voltage is applied between the reflective electrode 105 and the counter electrode 106. When an electric field is applied to the liquid crystal composition 103, the liquid crystal molecules align in a direction of the electric field and consequently, the influence of birefringence of the liquid crystal molecules weakens. As a result, the linearly polarized light L2 entering the liquid crystal display panel 100 is reflected by the reflective electrode 105 without undergoing changes, and then the light L5 emergent from the liquid crystal display panel 100 has the same direction of polarization as that of the incident light L2. The emergent light L5 passes through the polarizing beam splitter 109, and returns to the light source such that no light is projected onto the screen and a black display is provided on the screen.

In the single-polarizer twisted nematic type, the direction of orientation of the liquid crystal molecules is parallel with the major surfaces of the substrates carrying the reflective electrode 105 and the counter electrode 106, and therefore usual methods of orientating the liquid crystal molecules can be employed and stability in manufacturing process is high. The normally white mode operation is preventive of defective displays occurring at low voltage levels. The reason is that, in the normally white mode, a dark level (a black display) is provided when a high voltage is applied across the liquid crystal layer, and in this state, almost all the liquid crystal molecules are orientated in the direction of the electric field which is perpendicular to the major surfaces of the substrates, and consequently, a display of the dark level does not depend very much upon the initial conditions of orientation of the liquid crystal molecules having a low electric field applied thereto.

The human eye perceives non-uniformity in luminance based upon the ratio of luminances, is responsive approximately to the logarithm of luminance, and consequently, is sensitive to variations in dark levels.

Because of the above reasons, the normally white mode has advantages with respect to prevention of non-uniformity in luminance caused by initial conditions of orientation of the liquid crystal molecules.

The electrically controlled birefringence mode requires a highly precise cell gap between the substrates of the liquid crystal display panel. The electrically controlled birefringence mode utilizes a phase difference between ordinary rays and extraordinary rays caused while they pass through the liquid crystal layer, and therefore the intensity of the light transmission through the liquid crystal layer depends upon the retardation $\Delta n \cdot d$ between the ordinary and extraordinary rays, where $\Delta n$ is a birefringence and d is a cell gap established by spacers between the substrates of the liquid crystal display panel.

In this embodiment, considering non-uniformity in a display, the manufacturing tolerance of the cell gap is chosen to be $\pm 0.05$ $\mu$m.

In the reflection type liquid crystal display panel, light entering the liquid crystal layer is reflected by the reflective electrode, and then passes through the liquid crystal layer. Therefore, if liquid crystal compositions having the same birefringence $\Delta n$ are used, the cell gap d of the reflection type is set to be half that of the transmission type. In the usual transmission type liquid crystal display panels, the cell gap is about 5 $\mu$m to about 6 $\mu$m, and therefore the cell gap in this embodiment is about 2 $\mu$m.

In this embodiment, to secure the smaller and high-precision cell gap, column-like spacers are used instead of using a conventional method of dispersing beads between the substrates.

Figure 3:
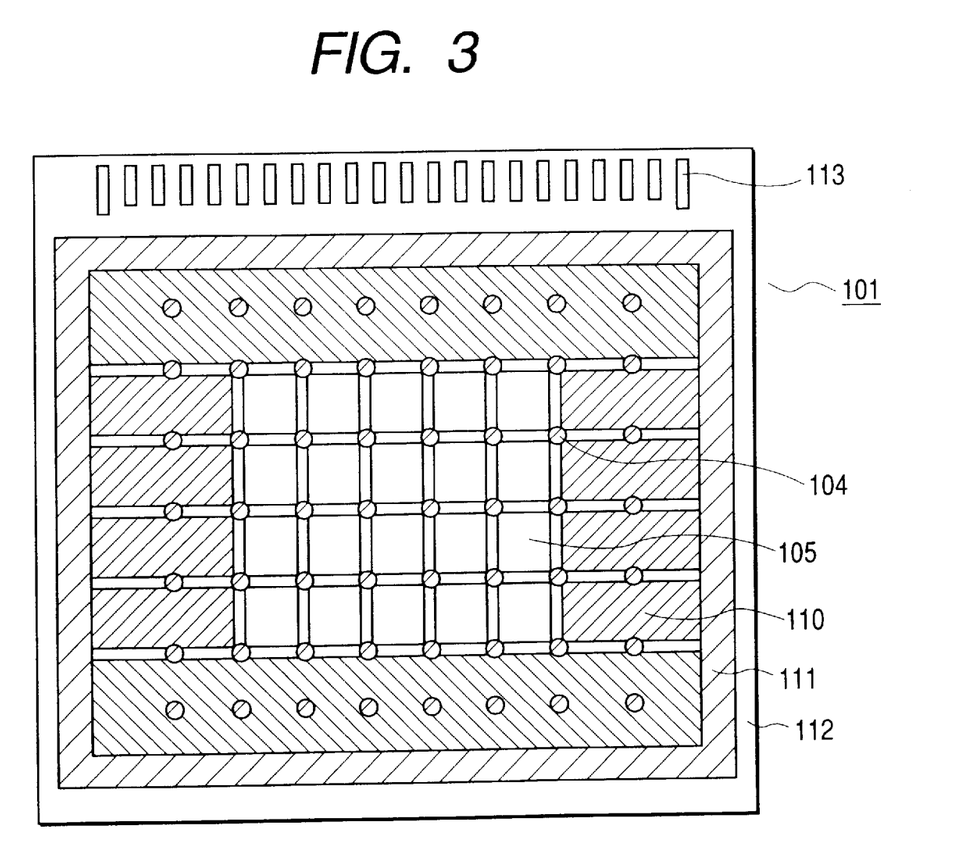
FIG. 3 is a schematic plan view of a driving circuit substrate having a reflective electrodes thereon in an embodiment in accordance with the present invention.

FIG. 3 is a schematic plan view of a driving circuit substrate 101 having the reflective electrodes 105 thereon. On the driving circuit substrate 101 is disposed the reflective electrodes 105 and the spacers 104. The spacers 104 are disposed in a matrix fashion over the entire driving circuit substrate 101 to ensure the high precision cell gap. Each of the reflective electrodes 105 forms a minimum pixel for forming an image on the liquid crystal display panel. For the sake of simplicity, FIG. 3 illustrates an array of five columns by four rows of pixels.

In FIG. 3, the array of five columns by four rows of pixels forms a display area, in which a display by the liquid crystal display panel is formed. Dummy pixels 110 are disposed around the display area, a peripheral frame 111 made of the same material as that of the spacers 4 is disposed around the dummy pixels 110, and a sealing member 112 is coated around the peripheral frame 111 on the driving circuit substrate 110. Reference numeral 113 denotes terminals for external connections which are used for supplying external signals to the liquid crystal display panel 100.

The spacers 104 and the peripheral frame 111 are formed of resin material which is a negative photoresist of the chemically sensitized type "BPR-113" (trade name) manufactured by JSR Co. Ltd. (Japan), for, example. The photoresist material is coated on the driving circuit substrate 101 having the reflective electrodes 105 thereon by spin coating, or the like, then the photoresist coating is exposed to form patterns of the spacers 104 and the peripheral frame 111 through a mask and by a light source, and then the photoresist coating is developed to form the spacers 104 and the peripheral frame 111 by using a remover.

The spacers 104 and the peripheral frame 104 made of the photoresist material or the like can be fabricated with high precision because their height can be controlled by the thickness of the coating. The positions of the spacers 104 are determined by the pattern of the mask, and consequently, the spacers 104 are capable of being positioned at their desired positions with accuracy.

In the liquid crystal projector, if the spacers 104 are present in the pixels, a problem arises that the shadows of the spacers 104 appear in an enlarged projected image. The spacers 104 fabricated by exposure through the pattern mask and subsequent development are capable of being disposed so as not to interfere with a displayed image.

The peripheral frame 111 is fabricated simultaneously with the spacers 104, and as a result, the liquid crystal composition 103 can be filled into a space between the driving circuit substrate 101 and a transparent substrate 102 (see FIG. 4) by dropping a small quantity of the liquid crystal composition 103 on the driving circuit substrate 101 and then attaching the transparent substrate 102 to the driving circuit substrate 101 and sealing them together.

When the liquid crystal display panel 100 is assembled after interposing the liquid crystal composition 103 between the driving circuit substrate 101 and the transparent substrate 102, the liquid crystal composition 103 is held within a region surrounded by the peripheral frame 111.

The sealing member 112 is coated around the outside of the peripheral frame 111 and confines the liquid crystal material 103 within the liquid crystal display panel 100.

As described above, the peripheral frame 111 is fabricated by using the pattern mask, and therefore it is fabricated on the driving circuit substrate 101 with high positional accuracy, and consequently, the border of the liquid crystal composition 103 can be defined with high accuracy. Further, the peripheral frame 111 can define the border of the sealing member 112 with high accuracy.

The sealing member 112 serves to fix the driving circuit substrate 101 and the transparent substrate 102 together, and also serves to prevent materials harmful to the liquid crystal composition 103 from penetrating thereinto. When the fluid sealing member 112 is applied, the peripheral frame 111 serves as a stopper against the sealing member 112. By disposing the peripheral frame 111 as the stopper against the sealing member 112, the design margin at the border of the liquid crystal composition 103 and that at the border of the sealing member 112 can be made smaller, and consequently, the region between the display area and the peripheral sides of the liquid crystal display panel 100 can be reduced, resulting in the reduction of the peripheral border around the display area.

The peripheral frame 111 is fabricated to surround the display area, and as a result, a problem arises in that, in performing a rubbing treatment on the surface of the driving circuit substrate 101 for orientating the liquid crystal molecules, the peripheral frame 111 impedes the rubbing treatment of the surface in the vicinity of the peripheral frame 111. In this embodiment, a liquid crystal molecule orientation film (not shown) is coated on the driving circuit substrate 101 after the spacers 104 and the peripheral frame 111 are fabricated on the driving circuit substrate 101, and then the rubbing treatment is performed by rubbing the liquid crystal molecule orientation film with a cloth or the like such that the rubbed orientation film orients the liquid crystal molecules of the liquid crystal composition 103 in a specified direction.

In the rubbing treatment, because the peripheral frame 111 is raised above the surface of the driving circuit substrate 101, the orientation film in the vicinity of the peripheral frame 111 is not rubbed sufficiently because of the step formed by the peripheral frame 111, and consequently, non-uniformity in orientation of the liquid crystal molecules is apt to occur in the vicinity of the peripheral frame 111. In order to make inconspicuous non-uniformity in a display caused by defective orientation of the liquid crystal molecules, some of the pixels immediately inside the peripheral frame 111 are made dummy pixels 110 which do not contribute to a display.

However, if the dummy pixel electrodes 110 are supplied with signals like the pixels 105 are supplied with signals, a problem arises in that displays produced by the dummy pixels 110 are also observed by the viewer because of the presence of the liquid crystal composition 103 between the dummy pixels 110 and the transparent substrate 102. In the liquid crystal display panel of the normally white type, the dummy pixels 110 appear white when a voltage is not applied across the liquid crystal layer, and consequently, the border of the display area becomes ill-defined and the quality of a display is deteriorated. It is conceivable to mask the dummy pixels 110, but it is difficult to fabricate a light-blocking frame at the border of the display area accurately because of a spacing of a few microns between the pixels, and therefore the dummy electrodes 110 are supplied with such a voltage that the dummy electrodes 110 display black images which appear as a black peripheral frame surrounding the display area.

Figure 4:
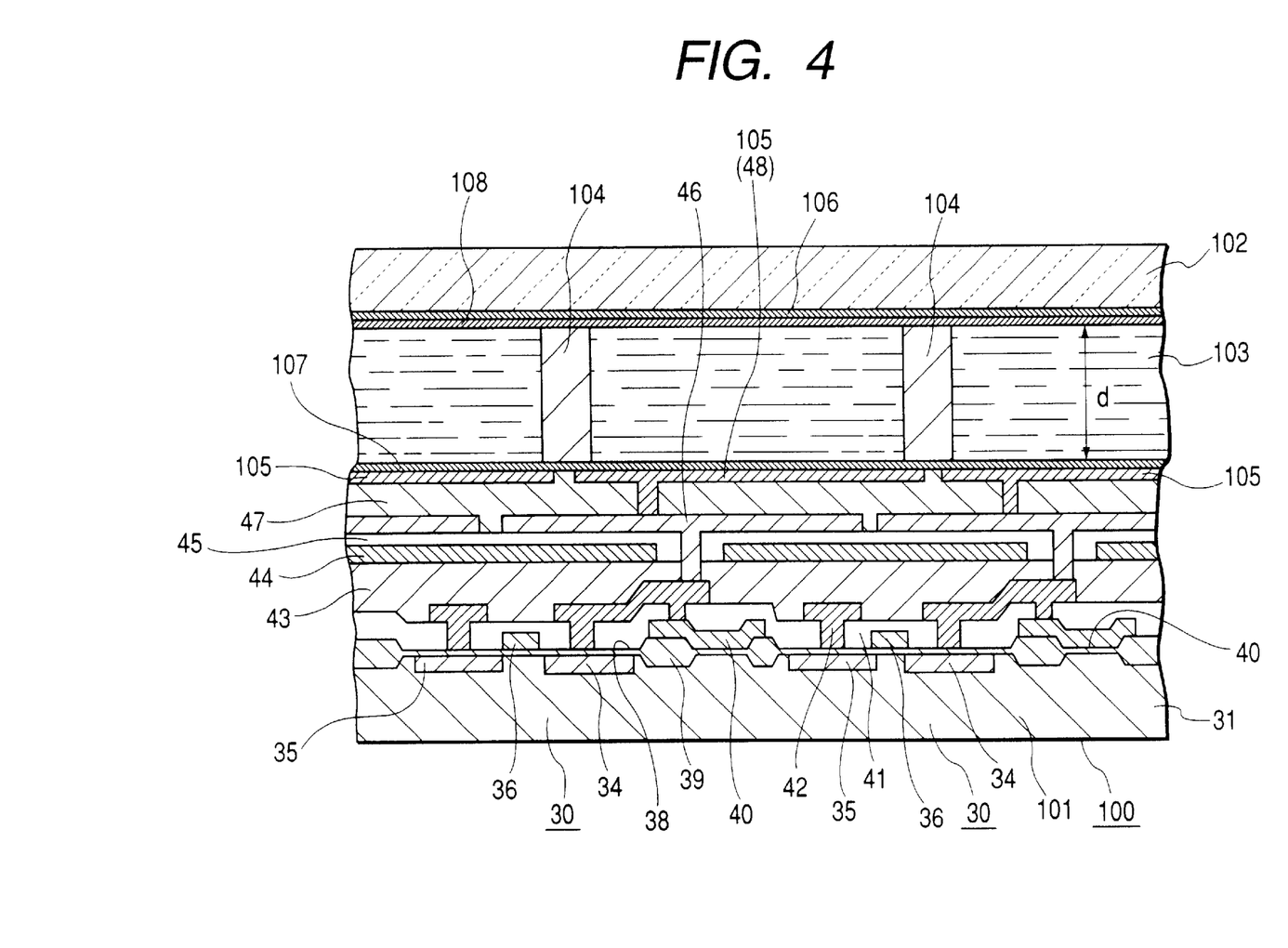
FIG. 4 is a schematic cross-sectional view for explaining an embodiment in accordance with the present invention.

Next, a pixel area in a liquid crystal display device in accordance with the present invention will be explained by reference to FIG. 4. FIG. 4 is a schematic cross-sectional view for explaining an embodiment in accordance with the present invention. In FIG. 4, reference numeral 100 denotes the liquid crystal display panel, 101 is the driving circuit substrate, 102 is the transparent substrate, 103 is the liquid crystal composition, and 104 are the spacers. The spacers 104 establish a fixed cell gap d between the driving circuit substrate 101 and the transparent 102. The liquid crystal composition 103 is confined in the cell gap d. Reference numeral 105 are reflective electrodes formed on the driving circuit substrate 101. Reference numeral 106 is the counter electrode which serves to apply a voltage across the layer of the liquid crystal composition 103 in cooperation with the reflective electrodes 105. Reference numerals 107 and 108 are orientation films which serve to orient the liquid crystal molecules in a specified direction. Reference numeral 30 are active elements for supplying a voltage to the reflective electrodes 105.

Reference numeral 34 denotes drain regions, 35 are source regions, 36 are gate electrodes, 38 is an insulating film, 39 are field oxide films for electrically separating adjacent transistors from each other, and 40 are retaining electrodes which form capacitances with the driving circuit substrate 1 with the insulating film 38 therebetween. Reference numeral 41 denotes a first interlayer film, 42 is a first conductive film, 43 is a second interlayer film, 44 is a first light-blocking film, 45 is a third interlayer film, 46 is a second light-blocking film, 47 is a fourth interlayer film, and 48 are second conductive films forming the reflective electrodes 5.

The liquid crystal display panel of this embodiment is of the reflection type. Light projected to the liquid crystal display panel 100 enters the transparent substrate 102 (at the top of FIG. 4), passes through the liquid crystal composition 103, then is reflected by the reflective electrodes, and again passes through the liquid crystal composition 103, passes through the transparent substrate 102, and exits from the liquid crystal display panel 100.

In a liquid crystal display panel of the reflection type, when the reflective electrode 105 is disposed on the surface of the driving circuit substrate 101 on the liquid crystal composition 103 side thereof, an opaque substrate such as a silicon substrate can be used as the driving circuit substrate 101, and further, the active elements 30 and wiring can be disposed below the reflective electrodes 105, and consequently, the advantage is obtained that the area of the respective reflective electrodes 105 which serve as pixels is made larger and therefore the so-called high aperture ratio is realized. Another advantage is that heat generated by the light projected to the liquid crystal display panel 100 is radiated from the rear surface of the driving circuit substrate 101.

Figure 5:
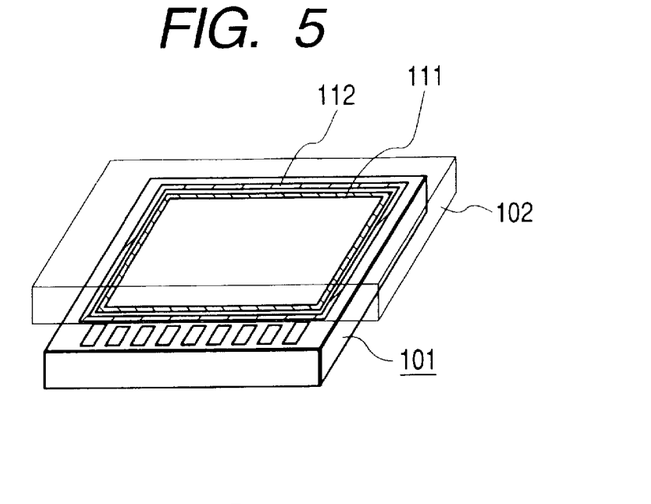
FIG. 5 is a perspective view of a driving circuit substrate superposed with a transparent substrate in an embodiment in accordance with the present invention.

FIG. 5 is a perspective view of the driving circuit substrate 101 superposed with the transparent substrate 102. Formed at the periphery of the driving circuit substrate 101 is the peripheral frame 111, and the liquid crystal composition 103 is confined in a space surrounded by the peripheral frame, the driving circuit substrate 101 and the transparent substrate 102. The sealing member 112 is coated around the outside of the peripheral frame 111 between the superposed driving circuit substrate 101 and transparent substrate 102. The driving circuit substrate 101 and the transparent substrate 102 are fixed together by the sealing member 112 to form the liquid crystal display panel 100.

Figure 6:
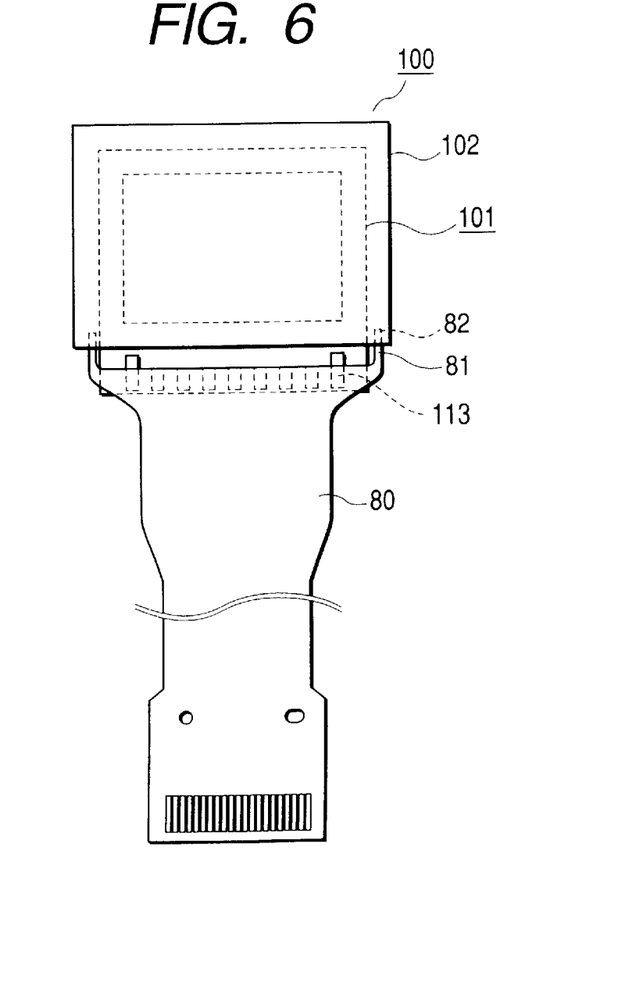
FIG. 6 is a plan view of a liquid crystal display panel having a flexible printed wiring board connected thereto.

Next, as shown in FIG. 6, a flexible printed wiring board 80 is connected to the terminals 113 for external connections which are used for supplying external signals to the liquid crystal display panel 100. Two outermost terminals on opposite sides of one end of the flexible printed wiring board 80 are made longer than the remainder of terminals, are connected to the counter electrode 106 formed on the transparent substrate 102, and thereby serve as counter-electrode terminals 81. In this way, the flexible printed wiring board 80 is connected to both of the driving circuit substrate 101 and the transparent substrate 102.

Conventionally, a flexible printed wiring board is connected to terminals for external connections disposed on the driving circuit substrate 101 only, and therefore the wiring to the counter electrode 106 from the flexible printed wiring board is made via the driving circuit substrate 101.

The transparent substrate 102 in this embodiment of the present invention is provided with connecting portions 82 to be connected to the flexible printed wiring board 80 such that the flexible printed wiring board 80 is connected directly to the counter electrode 105. The liquid crystal display panel 100 is formed by superposing the transparent substrate 102 on the driving circuit substrate 101. The transparent substrate 102 is superposed on the driving circuit substrate 101 such that a peripheral portion of the transparent substrate 102 extends beyond the outside edges of the driving circuit substrate 101 and provides the connecting portions 82 where the flexible printed wiring board 80 is connected to the counter electrode 106.

Figure 7:
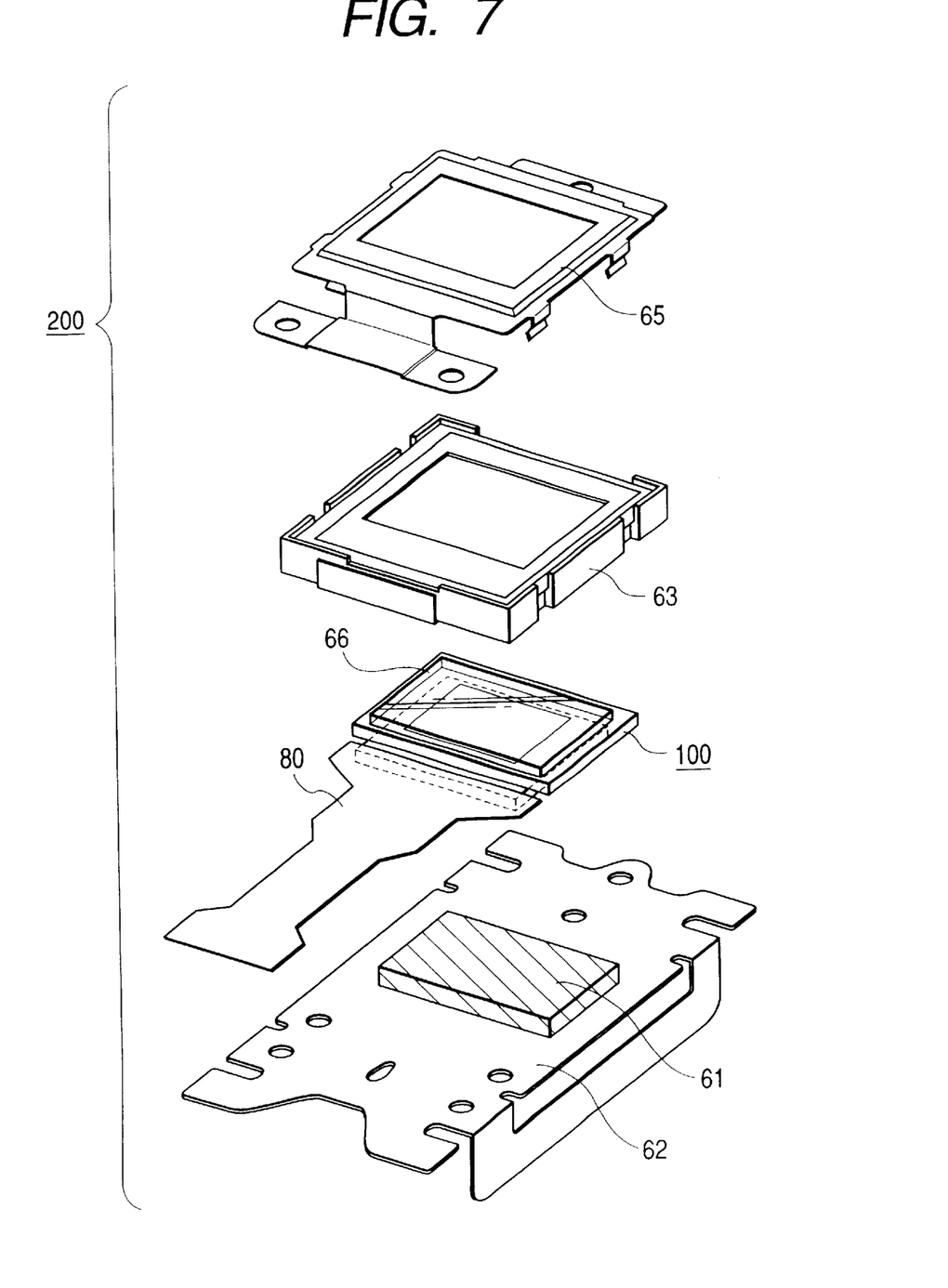
FIG. 7 is an exploded view in perspective of major elements of a liquid crystal display device in an embodiment in accordance with the present invention.
Figure 8:
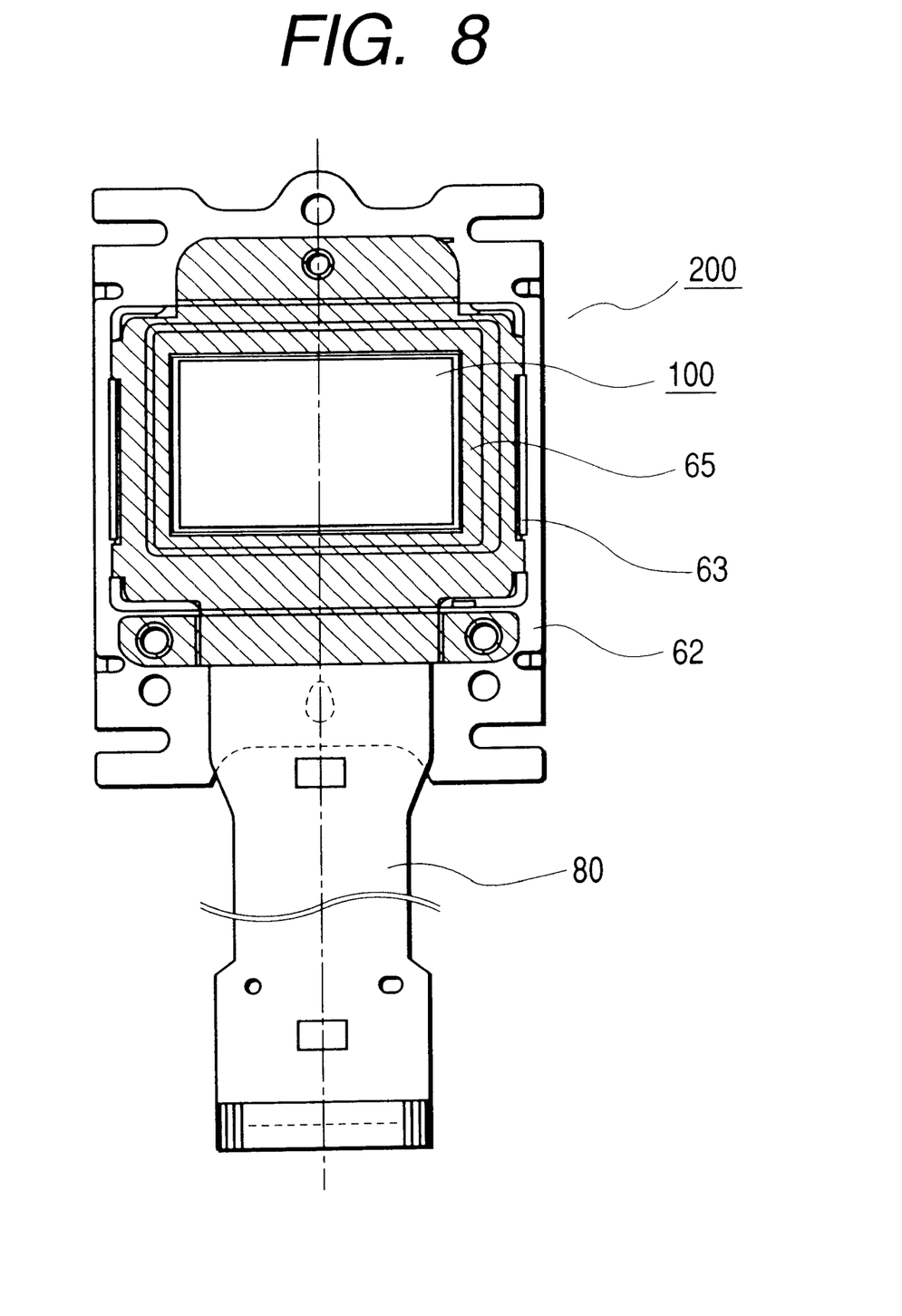
FIG. 8 is a plan view of a liquid crystal display device in accordance with an embodiment of the present invention.

FIGS. 7 and 8 illustrate a configuration of the liquid crystal display device 200. FIG. 7 is an exploded view in perspective of the major elements of the liquid crystal display device 200, and FIG. 8 is a plan view of the liquid crystal display device 200.

As shown in FIG. 7, the liquid crystal display panel 100 having the flexible printed wiring board 80 connected thereto is disposed on the heat-radiating plate 62 with a cushion member 61 interposed therebetween. The cushion member 61 is highly heat-conductive, and fills a gap between the heat-radiating plate 62 and the liquid crystal display panel 100 for heat from the liquid crystal display panel 100 to conduct to the heat-radiating plate 62 easily. Reference numeral 63 denotes a mold, which is fixed to the heat-radiating plate 62 with an adhesive.

As shown in FIG. 8, the flexible printed wiring board 80 is passed between the mold 63 and the heat-radiating plate 62, and then is brought out of the mold 63. Reference numeral 65 denotes a light-blocking plate which prevents light from a light source from entering the unintended portions of the liquid crystal display device 200, and 66 is a light-blocking frame which defines the display area of the liquid crystal display device 200.

What is claimed is:

1. A color liquid crystal projector including
    an optical system for splitting light from a light source into first primary-color light, second primary-color light and third primary-color light,
    first, second and third reflection type liquid crystal display panels corresponding to said first primary-color light, said second primary-color light and said third primary-color light, respectively, and
    a projection lens for projecting said first primary-color light, said second primary-color light and said third primary-color light from said optical system onto a screen,
    said optical system comprising:
    a linear polarizer receiving the light from the light source;
    a mirror for reflecting said first primary-color light in the light from said linear polarizer and transmitting said second primary-color light and said third primary-color light in the light from said linear polarizer;
    a first phase plate for rotating a direction of polarization of said second primary-color light from said mirror through 90° and transmitting said second primary-color light, and for transmitting said third primary-color light without changing a direction of polarization thereof;
    a first prism for transmitting said second primary-color light from said first phase plate and then entering said second primary-color light into said second liquid crystal display panel, and reflecting said third primary-color light from said first phase plate and then entering said third primary-color light into said third liquid crystal display panel;
    a second prism for entering said first primary-color light from said mirror into said first liquid crystal display panel;
    a dichroic prism for combining said first primary-color light, said second primary-color light and said third primary-color light reflected from said first, second and third liquid crystal display panels, respectively; and
    a second phase plate disposed between said dichroic prism and said first prism for rotating the direction of polarization of said second primary-color light through 90° and transmitting said second primary-color light, and transmitting said third primary-color light without changing the direction of polarization thereof.

2. A color liquid crystal projector according to claim 1, wherein said optical system further comprises a third phase plate disposed between said second prism and said dichroic prism for rotating a direction of polarization of said first primary-color light through 90° and transmitting said first primary-color light.

3. A color liquid crystal projector according to claim 1, wherein said optical system further comprises a glass plate disposed between said second prism and said dichroic prism for equalizing optical path lengths of said first, second and third primary-color lights.

4. A color liquid crystal projector according to claim 1, wherein said first phase plate, said first prism, said dichroic prism and said second prism are cemented together.

5. A color liquid crystal projector comprising a light source and an optical system for reflecting light from said light source by reflection type liquid crystal display panels and projecting light reflected from said reflection type liquid crystal display panels,
    said optical system including:
    a mirror for reflecting a light of a first wavelength of said light from said light source and reflecting lights of second and third wavelengths of said light from said light source;
    a first phase plate for rotating a direction of polarization of said light of said second wavelength through 90° from said mirror and transmitting said light of said second wavelength, and transmitting said light of said third wavelength without changing a direction of polarization thereof;
    a first prism for transmitting said light of said second wavelength from said first phase plate and reflecting said light of said third wavelength from said first phase plate;
    a first reflection type liquid crystal display panel for reflecting said light of said first wavelength from said mirror;
    a second reflection type liquid crystal display panel for reflecting said light of said second wavelength from said first prism;
    a third reflection type liquid crystal display panel for reflecting said light of said third wavelength from said first prism; and
    a dichroic prism for combining lights from said first, second and third reflection type liquid crystal display panels;

each of said first, second and third reflection type liquid crystal display panels being provided with reflective electrodes for reflecting light entering a liquid crystal layer thereof; and a second phase plate disposed between said dichroic prism and said first prism for rotating the direction of polarization of said light of said second wavelength through 90° and transmitting said light of said second wavelength, and transmitting said light of said third wavelength without changing the direction of polarization thereof.

6. A color liquid crystal projector according to claim 5, wherein said color liquid crystal projector further comprises a second prism for reflecting said light of said first wavelength from said mirror and entering said light of said first wavelength into said first reflection type liquid crystal display panel, and a third phase plate disposed between said second prism and said dichroic prism for rotating a direction of polarization of said light of said first wavelength through 90° and transmitting said light of said first wavelength.

7. A color liquid crystal projector according to claim 5, wherein said color liquid crystal projector further comprises a second prism for reflecting said light of said first wavelength from said mirror and entering said light of said first wavelength into said first reflection type liquid crystal display panel, and a glass plate disposed between said second prism and said dichroic prism for equalizing optical path lengths of said lights of said first, second and third wavelengths.

8. A color liquid crystal projector according to claim 5, wherein said first phase plate and said first prism are cemented together.

* * * * *